US008079690B2

(12) United States Patent
Johnson et al.

(10) Patent No.: US 8,079,690 B2
(45) Date of Patent: Dec. 20, 2011

(54) METHOD FOR RECONFIGURING INK LOADERS TO ACCEPT DIFFERENT INK STICK IDENTIFIERS

(75) Inventors: R. Scott Johnson, Northfield, NH (US); Christopher Ryan Gold, Tigard, OR (US); Frederick T. Mattern, Portland, OR (US); Brent Rodney Jones, Sherwood, OR (US); William Loren Emery, Sherwood, OR (US); Karen Vicki Zocchi, Beaverton, OR (US)

(73) Assignee: Xerox Corporation, Norwalk, CT (US)

( * ) Notice: Subject to any disclaimer, the term of this patent is extended or adjusted under 35 U.S.C. 154(b) by 594 days.

(21) Appl. No.: 12/204,185

(22) Filed: Sep. 4, 2008

(65) Prior Publication Data

US 2010/0053282 A1 Mar. 4, 2010

(51) Int. Cl.

*B41J 2/175* (2006.01)
*B41J 29/393* (2006.01)
*G01D 11/00* (2006.01)

(52) U.S. Cl. ................................ 347/88; 347/99; 347/19

(58) Field of Classification Search .................... 347/88, 347/19, 99

See application file for complete search history.

(56) References Cited

U.S. PATENT DOCUMENTS

| | | | | |
|---|---|---|---|---|
| 5,602,635 | A | 2/1997 | Domoto et al. | |
| 6,595,907 | B1 | 7/2003 | Ishikawa et al. | |
| 7,324,779 | B2 | 1/2008 | Anderson et al. | |
| 7,336,920 | B2 | 2/2008 | Anderson et al. | |
| 7,648,232 | B2 * | 1/2010 | Jones | 347/88 |

* cited by examiner

*Primary Examiner* — Geoffrey Mruk

(74) *Attorney, Agent, or Firm* — Maginot, Moore & Beck, LLP

(57) ABSTRACT

A method of using a phase change ink imaging device includes receiving an $n^{th}$ ink stick in an ink loader of a phase change ink imaging device where n is a predetermined number. The $n^{th}$ ink stick includes at least one sensor contour formed thereon. The at least one sensor contour is associated with an ink stick identifier. The at least one sensor contour on the $n^{th}$ ink stick is detected using a sensor system in the ink loader. At least one signal is generated based on the detection of the at least one sensor contour, the at least one signal being indicative of the ink stick identifier. The ink stick identifier indicated by the at least one signal is then stored as a designated ink stick identifier for use with the phase change ink imaging device.

20 Claims, 6 Drawing Sheets

METHOD FOR RECONFIGURING INK LOADERS TO ACCEPT DIFFERENT INK STICK IDENTIFIERS

TECHNICAL FIELD

This disclosure relates generally to phase change ink jet printers and the solid ink sticks used in such ink jet printers.

BACKGROUND

Solid ink or phase change ink printers conventionally receive ink in a solid form, either as pellets or as ink sticks. The solid ink pellets or ink sticks are typically inserted through an insertion opening of an ink loader for the printer, and the ink sticks are pushed or slid along the feed channel by a feed mechanism and/or gravity toward a heater plate in the heater assembly. The heater plate melts the solid ink impinging on the plate into a liquid that is delivered to a print head for jetting onto a recording medium.

Ink sticks may be provided with sensor features for conveying ink stick data, or ink stick identifiers, to the print control system. The nature of solid ink technology renders the addition of conventional labels or tagging mechanisms, such as barcode or RFID tags, for conveying ink stick data to the printer control system impractical. Accordingly, ink stick sensor features are formed into and from the ink stick body itself that are configured to interact with sensors in the ink loader to convey ink stick data, or ink stick identifiers, to the print control system. Sensor features are configured to interact with sensors in the ink loader of the imaging device to generate signals indicative of ink stick identifiers pertaining to the ink sticks.

An imaging device controller having access to the identifiers generated by the sensor features may compare the generated ink stick identifiers to one or more designated ink stick identifiers that may be, for example, stored in the memory of the controller. The designated ink stick identifiers stored in the memory to which the generated ink stick identifiers are compared correspond to ink stick types that are intended for use with the particular imaging device. In this manner, ink loaders may be configured to differentiate ink sticks based on ink stick identifiers so that ink sticks may be sold, marketed, distributed, etc. in accordance with different marketing programs, price points, geographic distribution areas, etc. The imaging device controller may then enable or disable operations of the ink loader or imaging device, optimize operations or influence or set operation parameters based on the ink stick identifiers generated by and received from the ink sticks themselves. For example, if an ink stick identifier indicates that an ink stick is not compatible with or not intended to be used with the imaging device, the control system may generate an alert signal or message to an operator and/or service personnel and disable printing operations.

Designated ink stick identifiers corresponding to one or more ink stick series that are intended to be used with the particular ink loader have typically been programmed, for example, into the memory of imaging device controller during manufacture of the device. Due to the wide range of possible ink stick configurations, i.e., series of ink sticks, and corresponding ink stick identifiers, designating ink loaders for use with a particular series of ink sticks and individually programming the ink loaders with the appropriate identifiers prior to sale or distribution may be prohibitively time consuming and costly.

SUMMARY

In one embodiment, a method of using a phase change ink imaging device includes receiving an $n^{th}$ ink stick in an ink loader of a phase change ink imaging device where n is a predetermined number. The $n^{th}$ ink stick includes at least one sensor contour formed thereon. The at least one sensor contour is associated with an ink stick identifier. The at least one sensor contour on the $n^{th}$ ink stick is detected using a sensor system in the ink loader. At least one signal is generated based on the detection of the at least one sensor contour, the at least one signal being indicative of the ink stick identifier. The ink stick identifier indicated by the at least one signal is then stored as a designated ink stick identifier for use with the phase change ink imaging device.

In another embodiment, a method of using a phase change ink imaging device comprises storing at least one ink stick identifier as at least one designated ink stick identifier for use with the phase change ink imaging device; placing the phase change ink imaging device in a setup mode in which the at least one designated ink stick identifiers may be modified; receiving at least one other ink stick identifier for the phase change ink imaging device in the setup mode; and storing the at least one other ink stick identifier as the designated ink stick identifiers for use with the phase change ink imaging device.

In yet another embodiment, an ink delivery system for use with a phase change ink imaging device comprises an ink loader of a phase change ink imaging device configured to receive ink sticks. A sensor system in the ink loader is configured to interact with sensor features of ink sticks in the ink loader and to generate signals indicative of ink stick identifiers embedded into the sensor features of the ink sticks. A controller is configured receive the signals indicative of the ink stick identifiers of the ink sticks and to compare the ink stick identifiers to a designated one or more ink stick identifier for use with the phase change ink imaging device and to generate a user alert in response to the ink stick identifiers not corresponding to the designated one or more ink stick identifier. The controller is configured to enter a setup mode in which the designated ink stick identifier may be modified. In the setup mode, the controller is configured to receive one or more ink stick identifiers and to store the received one or more ink stick identifiers as the designated ink stick identifiers.

DETAILED DESCRIPTION OF THE PREFERRED EMBODIMENT

Figure 1:
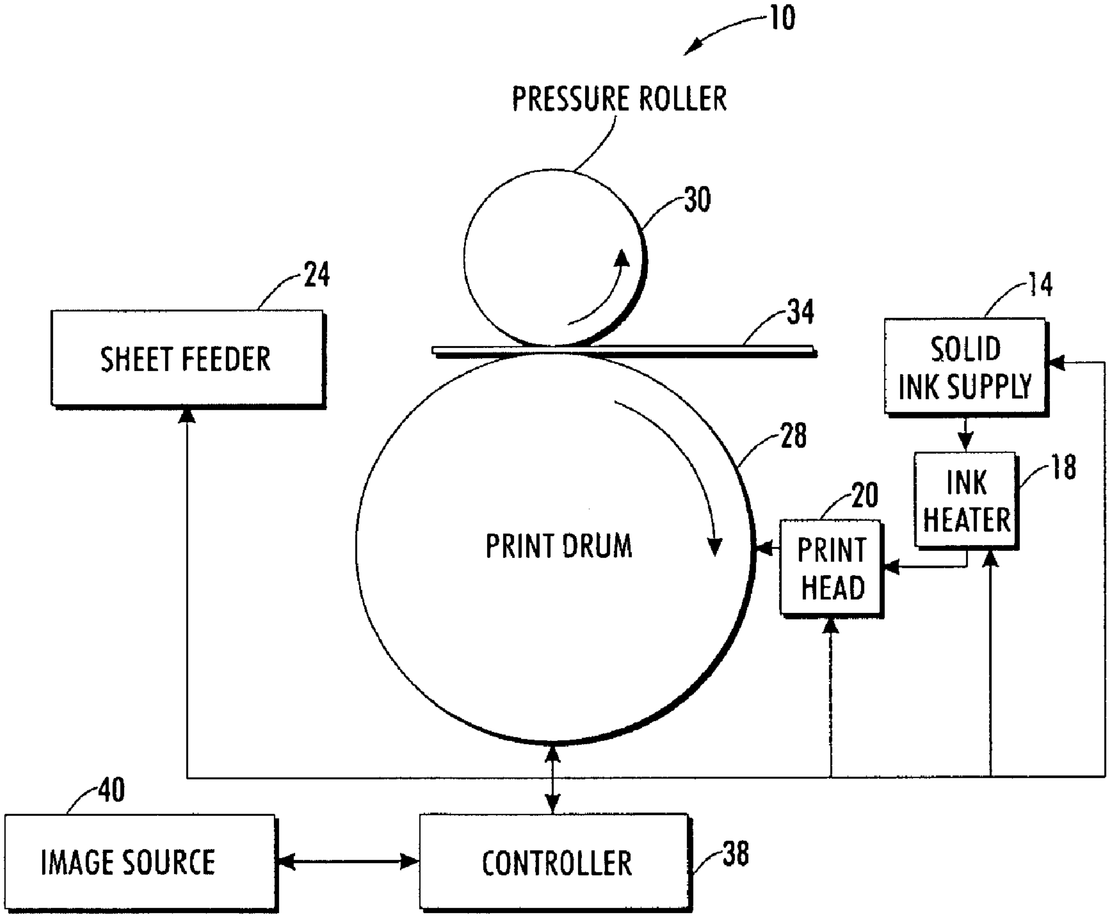
FIG. 1 PRIOR ART
FIG. 1 is a block diagram of a phase change ink imaging device.

For a general understanding of the present embodiments, reference is made to the drawings. In the drawings, like reference numerals have been used throughout to designate like elements. As used herein, the term “printer” refers, to reproduction devices in general, such as printers, facsimile machines, copiers, and related multi-function products; and the term “print job” refers, for example, to information including the electronic item or items to be reproduced. References to ink delivery or transfer from an ink cartridge or housing to a printhead are intended to encompass the range of melters, intermediate connections, tubes, manifolds and/or other components and/or functions that may be involved in a printing system but are not immediately significant to the present disclosure.

Referring now to FIG. 1, there is illustrated a block diagram of an embodiment of a phase change ink imaging device 10. The imaging device 10 has an ink supply 14 which receives and stages solid ink sticks. An ink melt unit 18 heats the ink stick above its melting point to produce liquefied ink. The melted ink is supplied to a printhead assembly 20 by gravity, pump action, or both. The imaging device 10 may be a direct printing device or an offset printing device. In a direct printing device, the ink may be emitted by the print head 20 directly onto the surface of a recording medium.

The embodiment of FIG. 1 shows an indirect, or offset, printing device. In offset printers, the ink is emitted onto a transfer surface 28 that is shown in the form of a drum, but could be in the form of a supported endless belt. To facilitate the image transfer process, a pressure roller 30 presses the media 34 against the ink on the drum 28 to transfer the ink from the drum 28 to the media 34.

Operation and control of the various subsystems, components and functions of the device 10 are performed with the aid of a controller 38. The controller 38 may be implemented as hardware, software, firmware or any combination thereof. In one embodiment, the controller 38 comprises a self-contained, microcomputer having a central processor unit (not shown) and electronic storage (not shown). The electronic storage may store data necessary for the controller such as, for example, the image data, component control protocols, etc. The electronic storage may be a non-volatile memory such as a read only memory (ROM) or a programmable non-volatile memory such as an EEPROM or flash memory. Of course, the electronic storage may be incorporated into the inkjet printer, or may be externally located.

The controller reads, captures, prepares and manages the image data flow between image sources 40, such as a scanner or computer, and imaging systems, such as the printhead assembly 20. The controller 38 is the main multi-tasking processor for operating and controlling many or all of the other machine subsystems and functions, including the machine's printing operations, and, thus, includes the necessary hardware, software, etc. for controlling these various systems.

Figure 2:
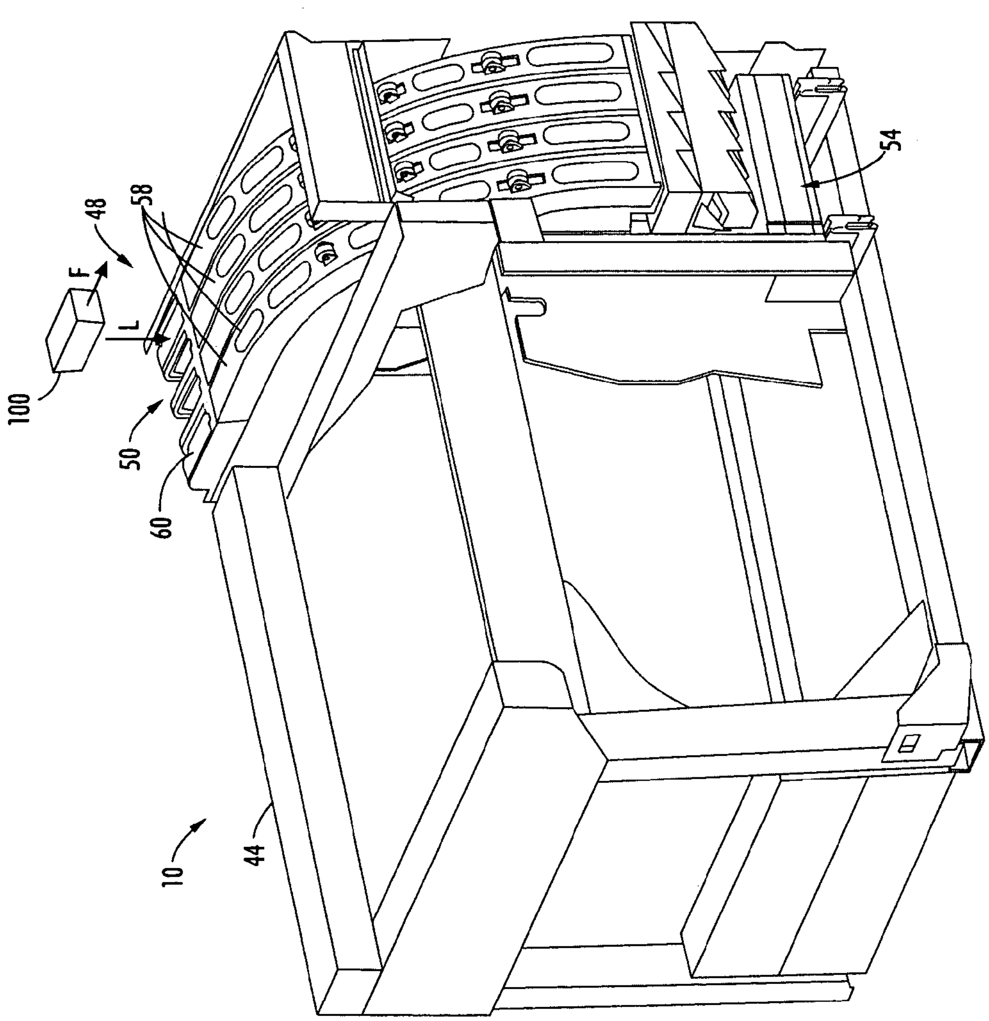
FIG. 2 is an enlarged partial top perspective view of an embodiment of an incomplete phase change ink imaging device with an ink loader.

Referring now to FIG. 2, the device 10 includes a frame 44 to which the operating systems and components are directly or indirectly mounted. A solid ink delivery system 48 advances ink sticks from loading station 50 to a melting station 54. The loading station includes keyed openings 60. Each keyed opening 60 limits access to one of the individual feed channels 58 of the ink delivery system. The keyed openings 60 are configured to accept only those ink sticks having key elements that comport with the key structures of the openings 60. Thus, the keyed openings 60 help limit the ink sticks inserted into a channel to a particular configuration such as color, ink formulation, etc. The ink delivery system 48 includes a plurality of channels, or chutes, 58 for transporting ink sticks from the loading station 60 to the melting station 54. A separate channel 58 is utilized for each of the four colors: namely cyan, magenta, black and yellow. The melting station 54 is configured to melt the solid ink sticks and supply the liquid ink to a printhead system (not shown).

In the embodiment of FIG. 2, the loading station receives ink sticks inserted through the keyed openings 60 in an insertion direction L. The feed channels are configured to transport ink sticks in a feed direction F from the loading station to the melting station. In the embodiment of FIG. 2, the insertion and feed directions L, F are different. For example, ink sticks may be inserted in the insertion direction L and then moved along the feed channel in the feed direction F. In an alternative embodiment, the feed channels and keyed openings may be oriented such that the insertion and feed directions L, F are substantially parallel.

Figure 3:
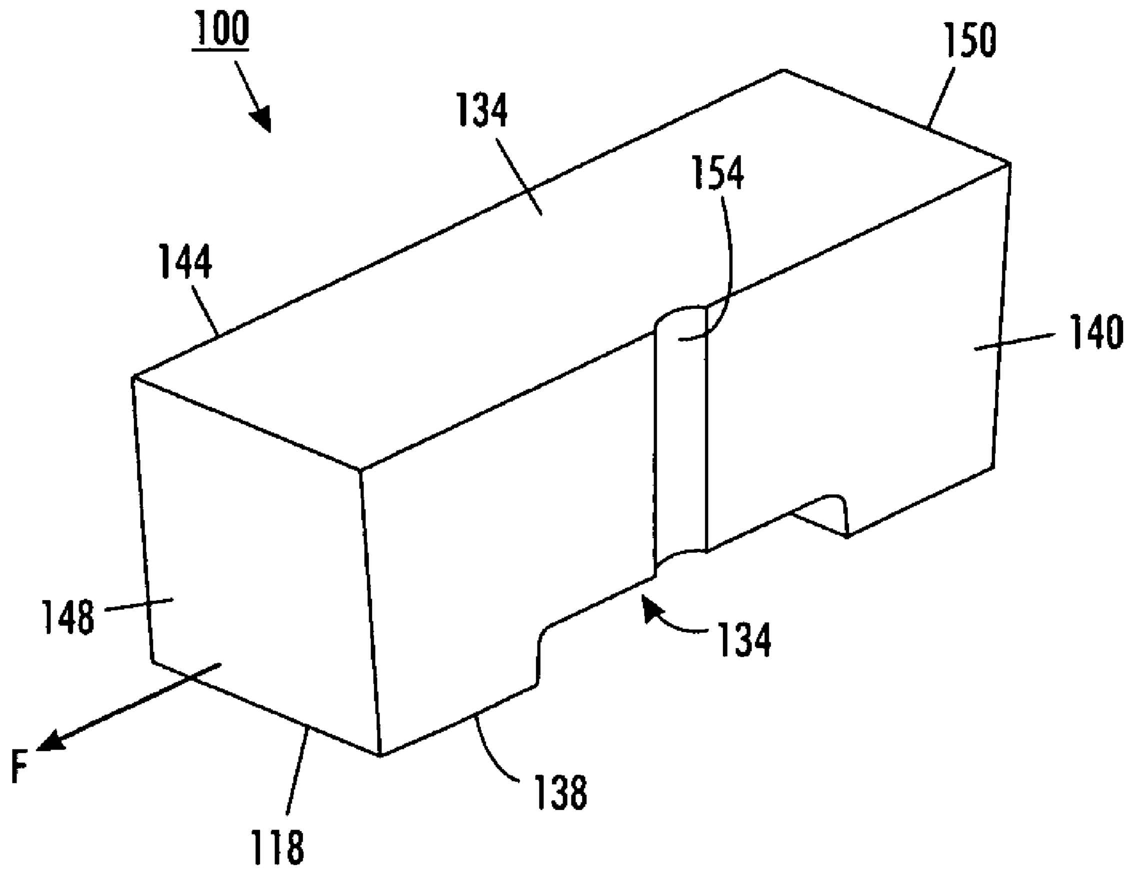
FIG. 3 is a perspective view of one embodiment of a solid ink stick.

An ink stick may take many forms. One exemplary solid ink stick 100 for use in the ink delivery system is illustrated in FIG. 3. The ink stick has a bottom surface 138 and a top surface 134. The particular bottom surface 138 and top surface 134 illustrated are substantially parallel one another, although they can take on other contours and relative relationships. Moreover, the surfaces of the ink stick body need not be flat, nor need they be parallel or perpendicular one another. The ink stick body also has a plurality of side extremities, such as lateral side surfaces 140, 144 and end surfaces 148, 150. The side surfaces 140 and 144 are substantially parallel one another, and are substantially perpendicular to the top and bottom surfaces 134, 138. The end surfaces 148, 150 are also basically substantially parallel one another, and substantially perpendicular to the top and bottom surfaces, and to the lateral side surfaces. One of the end surfaces 148 is a leading end surface, and the other end surface 150 is a trailing end surface. The ink stick body may be formed by pour molding, injection molding, compression molding, or other known techniques.

Ink sticks may be provided with features that aid in the identification and differentiation of ink sticks in accordance with one or more factors such as color of ink, intended printer model or platform, marketing program, price point, geographic distribution area, etc. One such feature is directed toward physically excluding incompatible ink sticks from being inserted into the ink loader of a printer. For example, the correct loading of ink sticks has been accomplished by incorporating keying contours into the exterior surface of an ink stick. Keying contours comprise shaped protuberances or indentations that are located in different positions on an ink stick. Correspondingly positioned and shaped key elements in the ink loader of the phase change ink printer allow insertion of ink sticks having the appropriately shaped and positioned key contours while excluding from insertion ink sticks which do not have the appropriate perimeter key contours. As an example, the ink stick of FIG. 3 includes an insertion keying feature 154. The insertion keying feature is configured to interact with the keyed openings 60 of the loading station 50 (FIG. 2) to admit or block insertion of the ink sticks through the insertion opening 60 of the solid ink delivery system. In the ink stick embodiment of FIG. 3, the key element 154 is a vertical recess or notch formed in side surface 140 of the ink stick body substantially parallel to the insertion direction L of the loading station. The corresponding complementary key (not shown) on the perimeter of the keyed opening 60 is a complementary protrusion into the opening 60.

Each color for a printer may have a unique arrangement of one or more key contours in the outer perimeter of the ink stick to form a unique cross-sectional shape for that particular color ink stick. The combination of the keyed openings in the key plate and the keyed shapes of the ink sticks insure that only ink sticks of the proper color are inserted into each feed channel. A set of ink sticks is formed of an ink stick of each color, with a unique key feature arrangement for ink sticks of each color. Insertion keying may also be used to differentiate ink sticks based on series. As used herein, series differentiation refers to differentiating ink sticks based on factors other than color such as printer model or platform, marketing strategy, price point, geographic distribution area, etc. Accordingly, ink sticks may also be provided with series key contours that enable differentiation of ink sticks based on series of ink sticks. Similar to color key contours, series key contours comprise shaped protuberances or indentations that are located in different positions on the perimeter of an ink stick. Identically or similarly configured series key contours may be provided on all of the ink sticks of a particular series. The insertion openings of ink loaders of printers intended for use with the particular series of ink stick may be provided with correspondingly positioned and shaped series key elements that are configured to allow insertion of ink sticks having the appropriately shaped and positioned series key contours while excluding from insertion ink sticks which do not have the appropriate series key contours.

As an alternative or in addition to the use of key contours on ink sticks to differentiate ink sticks based on color and/or series, ink sticks may be provided with sensor features for conveying ink stick data, or ink stick identifiers, to the print control system. The nature of solid ink technology renders the addition of conventional labels or tagging mechanisms, such as barcode or RFID tags, for conveying ink stick data to the printer control system impractical. Accordingly, ink stick sensor features are formed into and from the ink stick body itself that are configured to interact with sensors in the ink loader to convey ink stick data, or ink stick identifiers, to the print control system. Sensor features are formed in predetermined locations on the ink stick and are configured to actuate or be detected by sensors in the ink delivery system 20. Sensor features may have any suitable configuration that permits reliable sensor actuation of a sensor or detector, directly or indirectly, such as by moving a flag or using an optical sensing system. For example, sensor features may comprise protrusions or indentations on the exterior surface of an ink stick. Some sensor features may have surfaces configured to reflect light from an optical source onto an optical detector.

An ink stick identifier may comprise one or more values, alphanumeric characters, symbols, etc. that may be associated with a meaning by an imaging device control system. In one embodiment, information may be encoded into an ink stick by selecting at least one unique ink stick identifier to be indicated by the sensor features of an ink stick and implementing an encoding scheme such that the signals generated by sensor features on the ink stick correspond to the ink stick identifier selected. In this way, sensor features may be used to embed information onto the ink stick that identifies the ink stick, such as a serial number, an identification code, or other index mechanism, an origin of the ink stick, ink stick formulation, date of manufacturing, stock keeping unit (SKU) number, part number, etc. In this manner, ink sticks may be differentiated based on color.

To implement an encoding scheme using sensor features, the sensor features of an ink stick may be configured to actuate sensors to generate signals having one of a discrete number of values, for example, two possible signals, i.e., a "high" or "low" signal. This may be accomplished by configuring a sensor feature to set a flag or to not set a flag, or by configuring an element to reflect light onto a detector or to not reflect light onto a detector, etc.

Figure 4:
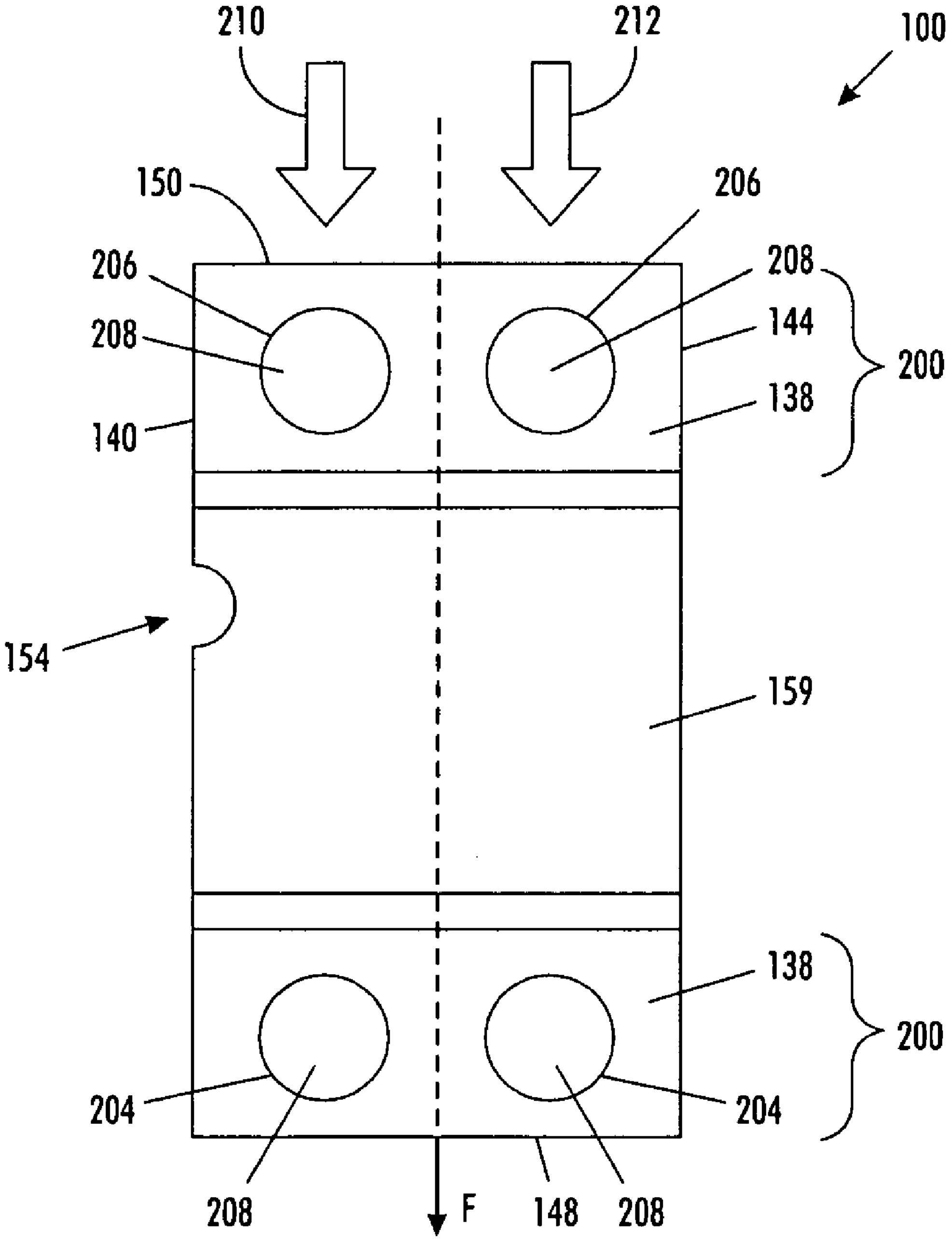
FIG. 4 is a bottom view of the ink stick of FIG. 3 showing the coded sensor features.

FIG. 4 shows an embodiment of an ink stick that includes sensor features 204, 206 for embedding an ink stick identifier into the ink stick 100. Each sensor feature 204, 206 is formed in a predetermined location on the ink stick 100 and is configured to actuate one or more sensors in a load or feed area of the ink loader. In the embodiment of FIG. 4, sensor features 204, 206 are shown on the bottom surface of the ink stick although the sensor features may be formed on any surface or more than one surface of the ink stick. Each sensor feature may protrude from or be recessed into the ink stick body and may be curved, spherical, angled, square or any shape that permits reliable sensor actuation, directly or indirectly, such as by moving a flag or actuator or using an optical sense system. For example, the sensor features in FIG. 4 have angled surfaces configured to reflect light from an optical source onto an optical detector. Alternatively, each code element may be configured to actuate one or more sensors based on a physical dimension of the code element, such as, for example, depth, length, width, angle, orientation or spacing between elements or any combination of dimensional features. The number and positioning of sensor features on an ink stick is limited only by the geometry of the ink sticks and sensor placement options. The sensor features may have any suitable arrangement, pattern, or the like, including arrays parallel or perpendicular to the feed direction, concentric rings, etc.

In order to minimize the number of light sources and detectors required to read the ink stick identifier embedded in the ink stick, the sensor features may be arranged in one or more linear arrays, or tracks, with each track 210, 212 forming a path substantially parallel to the feed direction F of the ink delivery system. The four sensor features 204, 206 of the ink stick of FIG. 4 are arranged in two tracks with the sensor features 204 comprising leading end sensor features of their respective tracks and the sensor features 206 comprising trailing end sensor features of their respective tracks. By arranging the sensor features in tracks parallel to the feed direction, each sensor feature in a track may be illuminated by a single light source as the ink stick is moved along a feed channel in the ink delivery system. Instantaneous identification of the ink sick based on detection of the sensor feature set may be accomplished in one stationary position by placing the appropriate light sources and detectors at each of the applicable locations.

Ink stick identifiers may be read by an appropriately configured sensor system in the ink loader of the imaging device. FIGS. 5A-D show an embodiment of a sensor system for reading the coded sensor features such as features 204, 206 of FIG. 4 (sensor feature 204 depicted in FIGS. 5A-D although same discussion applies to feature 206). In this embodiment, the sensor system includes an optical source 218 and one or more optical sensors 220, 224. The optical source 218 may comprise a light emitting diode (LED) or laser diode and may employ an aperture or a collimating lens which collimates the beam emitted from the LED or laser diode toward the target surface 208 of a coded sensor feature of the ink stick. The optical sensors 220, 224 may comprise photodiodes which converts detected light to electrical signals. The optical sensor 128 may include an amplifier (not shown) for amplifying the detected signal and an optical filter (not shown) tuned to the wavelength of light emitted by the optical source 218 for eliminating stray light. While the optical sensors described comprise photodiodes, other types of light sensors, such as, for example, phototransistors, quad comparator, photo position sensor and CdS photocells, may be employed.

FIGS. 5A-D depict how the target surface 208 of a sensor feature 204 may be oriented or angled to direct light onto one or more of the optical sensors 220, 224. For example, in FIG. 5A, the target surface 208 is oriented or angled to direct light onto the first detector 220. Similarly, in FIG. 5B, there is shown a target surface 208 that is configured to reflect light onto the second detector 224. A target surface configured to direct light onto a detector may be angled as a flat surface or may be an angled contour that maximizes directional reflectance. To facilitate optical detection, target surfaces may be treated or coated with, for example, a retro-reflective coating to enhance the reflective property of the surface. Coatings, surface texture, depth and contours of the reflective surface can be incorporated as appropriate to the light wavelength, reflective properties of the material, electronic circuit, apertures or other system considerations or elements. Reflected light intensity may be intentionally reduced by employing coatings, localized dopants, angles, surface topography or other surface characteristics. Reduced reflected light intensity in regions surrounding the target surface would improve discretion between detectors. Reduced reflectivity of a target surface would provide a modified signal strength from the detector electrical circuit, such as lower voltage. Reflection modification or control may be used to influence the amount of light directed to one or more sensors. As example, a sensor feature in stick "A" might be configured to reflect light to the highest extent reasonably capable with a given set of parameters while stick "B" employs light reflection reducing topography for that feature, providing a reduction of reflected light to the detector and consequently, the means to determine the difference between the two based on a characteristic of the electronic signal. Detector signal strength variations may be segmented into more than the two example divisions. This method of adding further variability to the sensor identifiers is applicable to all sensor/feature configurations encompassed by this concept.

Figure 5A:
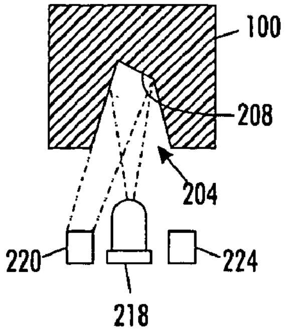
FIGS. 5A-D depict a sensor system for interacting with the coded sensor features of an ink stick.
Figure 5B:
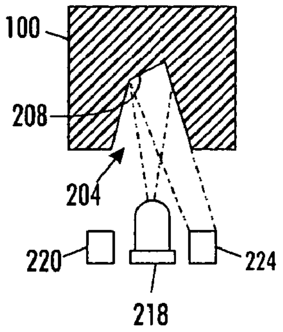
Figure 5C:
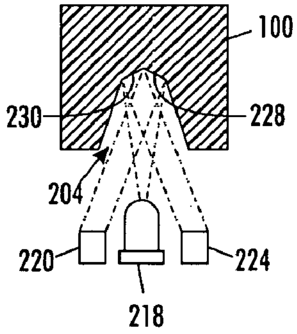
Figure 5D:
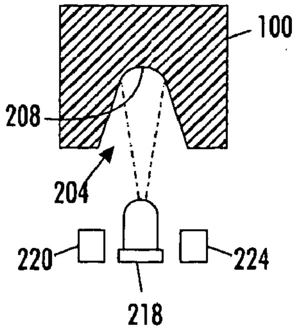

Target surfaces may also be configured to direct light onto multiple detectors or to direct light away from detectors. For example, FIG. 5C shows a target surface that includes facet 228 configured to direct light onto the first detector 220 and facet 230 configured to direct light onto the second detector 224. FIG. 5D shows the case of a reflection surface that is configured to not reflect light or to reflect light away from the one or more associated detectors. In this case, nominal reflection of light absent the inset reflection surface would be toward one or more sensors. This example serves to illustrate that a reflection surface which directs light away from one or more detectors can be equivalent in function to a surface that directs light toward one or more detectors. The reflection surface may have any suitable configuration that is capable of performing the function of directing light away from the detectors. For example, in FIG. 5D, the reflection surface 208 is embodied as a concave surface that is configured to limit the amount of light reflected onto the detectors 220, 224.

In the embodiment of FIGS. 5A-D, the optical source 218 and the optical sensors 220, 224 are fixedly mounted in an ink loader in a position for the optical source to interact with the coded sensor features of an ink stick as the ink stick 100 is loaded or transported along a feed path. The optical source 218 and the optical sensors 220, 224 may be located at any point along the path of movement of the ink stick 100 and could be mounted to the loader or other structure of the print device. Sensor features may be read during insertion of the ink stick into the ink loader or as the ink is positioned in an insertion location or as the ink stick is moved along a feed channel in the ink loader. Code reading in the channel may occur one or more times at one or more positions along the path of travel of the ink stick. Scanning or moving a sensor device across the sensor features with the ink in a stationary position may be done as an alternative to reading the code while the ink is in motion, such as during insertion or fed. In yet another configuration, a combination of stationary and moving stick code reading could be done.

The signals generated in response to the interaction of the sensor features of an ink stick and the sensors in the ink loader may be received and processed by the imaging device controller into the ink stick identifiers encoded into the ink stick sensor features in any suitable manner encompassed in the art. An imaging device controller, having access to the identifiers generated by the sensor features may compare the generated ink stick identifiers to one or more designated ink stick identifiers that may be, for example, stored in the memory of the controller. The designated ink stick identifiers stored in the memory to which the generated ink stick identifiers are compared correspond to ink stick types that are intended for use with the particular imaging device. In this manner, ink loaders may be configured to differentiate ink sticks based on ink stick identifier so that ink sticks may be sold, marketed, distributed, etc. in accordance with different marketing programs, price points, geographic distribution areas, etc. The imaging device controller may then enable or disable operations of the ink loader or imaging device, optimize operations or influence or set operation parameters based on the ink stick identifiers generated by and received from the ink sticks themselves. For example, if an ink stick identifier is not recognized, not identified as acceptable or indicates that an ink stick is not compatible with or not intended to be used with the imaging device, the control system may generate an alert signal or message to an operator and/or service personnel and disable printing operations. Printing operation in this instance may also be modified, prevented or be limited to the amount of acceptable ink previously in place.

Designated ink stick identifiers corresponding to one or more ink stick series that are intended to be used with the particular ink loader have typically been programmed, for example, into the memory of the imaging device controller during manufacture of the device. Due to the wide range of possible ink stick configurations, i.e., series of ink sticks, and corresponding ink stick identifiers, individually programming each ink loader with the appropriate identifiers to enable series differentiation may be prohibitively time consuming and costly. Accordingly, methods have been developed that enable a common solid ink loader to be configured to use a particular series of ink stick after the manufacture of the loader. This allows the final product to be sold and/or distributed under any of a number of possible marketing programs, geographic distribution areas, price points, etc. without additionally having to preprogram designated ink stick identifiers for each loader.

In one embodiment, the controller is configured to enter a setup mode which enables access to and modification of the designated ink stick identifiers associated with an imaging device. Printing operations may be disabled while in the setup mode until a designated ink stick identifier has been established for the imaging device. The setup mode may be activated in any suitable manner such as by hardware switch, selectable user option via the user interface of the imaging device, insertion of the first type of non generic ink stick, insertion of a generic, universal, regional or other similar ink stick, etc. The term generic is here intended to encompass factory or regional default sticks as well as ink sticks that may not be specific to a sales program in one or more markets. Although not discussed in detail here, the setup mode may have restricted access such as by password, security key or other restrictive method. Some limiting or specific ink usage settings may be programmed into the printer at the factory or distribution center which sets ink usage to one or more of a type that may or may not be easily changed or added to at an end user site.

In the setup mode, the controller is configured to receive at least one ink stick identifier as an input and to set a designated ink stick identifier to correspond to the at least one ink stick identifier received as an input. The controller may be configured to, for example, store the received ink stick identifier to a predetermined location in memory corresponding to a designated ink stick identifier location. The controller may also be configured to determine whether the ink stick identifier received from the sensor system is a valid identifier. For example, in one embodiment, the memory of the controller may be programmed with a list of compatible ink stick identifiers. In this embodiment, the controller is configured to compare the identifier received from the sensor system to the list of ink stick identifiers stored in memory. The list of ink stick identifiers may include one or more ink stick identifiers that have been pre-assigned to be for use with the particular imaging device. If the ink stick identifier received by the controller from the sensor system is on the list of pre-assigned identifiers, than the controller may then set the designated ink stick identifier to the received ink stick identifier. The list of ink stick identifiers may include data that enables the controller to differentiate generic, demo, or factory ink sticks from program ink sticks, i.e., ink sticks intended to be used with a particular marketing program, geographic distribution area, price point, etc. If the printer cannot identify the received ink stick identifier or the identifier indicates that the ink stick is demo or factory stick while in the setup mode, the controller may be configured to disable printing operations and/or generate a user alert until the ink stick is removed from the ink loader. Similar user alerts may be generated for any number of reasons related to identifying ink sticks, including damaged or otherwise unreadable ink sticks.

The first stick inserted after printer installation could be used to establish the designated ink stick identifier (ID that will be accepted). If a generic ink form is supplied along with the product or is intended to be available as an alternative, some subsequent required $n^{th}$ stick may be used to establish the designated identifier, providing a comfortable start-up operation period where generic ink could be used. As example, the printer might be pre-programmed so that “n” is the third stick inserted or received and that stick sets or initiates setting of a designated identifier for ink that would be accepted by the printer from that point on. A setup mode may additionally or alternatively be entered to convey the designated identifier. This method assumes some control over ink availability but may also include the step of obtaining confirmation or acceptance by use of a code or network connection.

Figure 6:
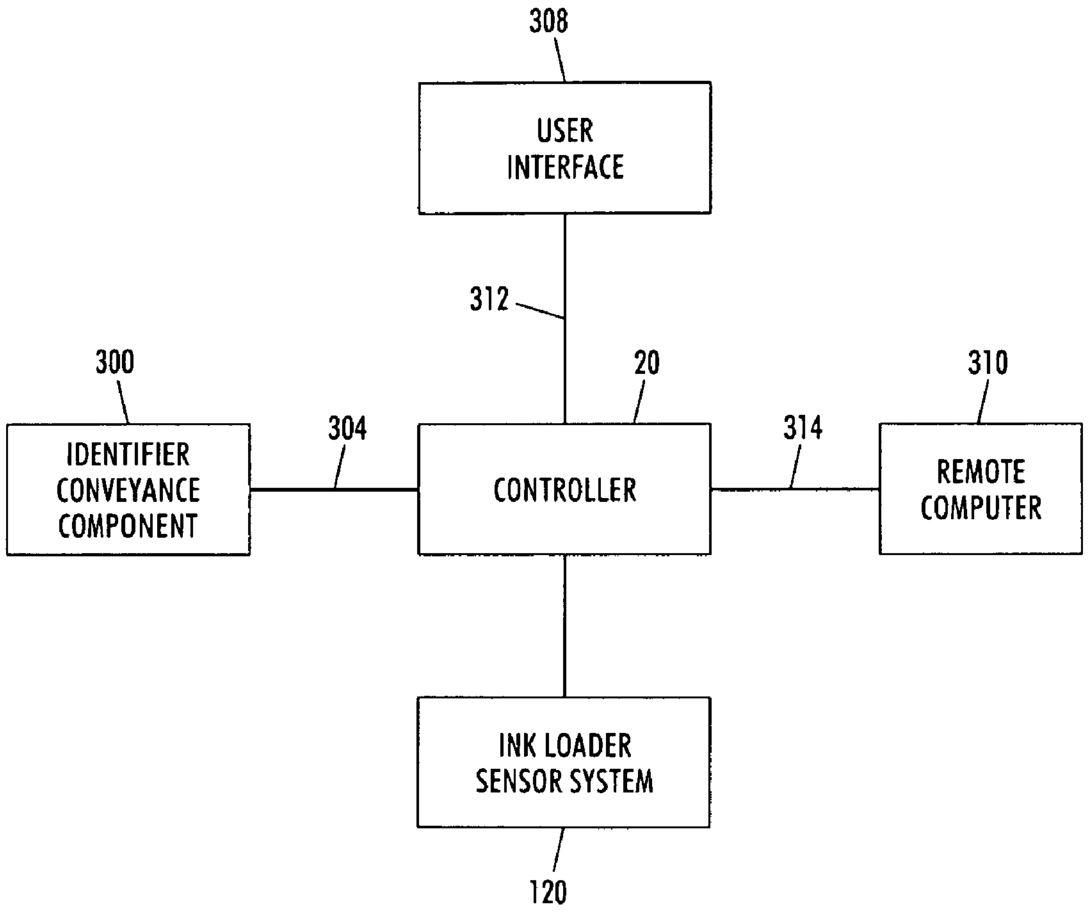
FIG. 6 is a block diagram of different methods that may be used to convey identifiers to an imaging device controller.

Ink stick identifiers corresponding to designated ink stick identifiers for use with a particular imaging device may be conveyed to the imaging device controller while in the setup mode in a number of ways. FIG. 6 shows a schematic diagram of the different methods that may be used to convey identifiers to an imaging device controller 20. In one embodiment, designated ink stick identifiers may be conveyed to the controller via the sensor system 120 interacting with the sensor features of an ink stick. For example, in the setup mode, the imaging device controller is configured to establish designated ink identifiers based on the recognition of the first set of ink sticks loaded, excluding those used for manufacturing, testing, and/or demos. In this embodiment, the imaging device controller is configured to set a designated ink identifier of the imaging device to the ink stick identifier associated with the next ink stick inserted into the ink loader of the imaging device.

As mentioned, sensor system 120 is configured to interact with the sensor features of an ink stick to generate one or more signals indicative of an ink stick identifier pertaining to the ink stick. Accordingly, in this embodiment, the controller may be configured to set the designated ink stick identifier to the next recognized ink stick identifier indicated by the signals received from the sensor system generated in response to the interaction between the sensor system and the sensor features of an ink stick. To ensure that the ink stick identifier received is the intended designated ink stick identifier, the controller may be configured to establish the designated ink identifiers in response to the insertion and subsequent reading of ink stick identifiers of two or more ink sticks inserted into the ink loader. Accordingly, the controller may be configured to compare the first received identifier to the second received identifier, and, if the first and second identifiers are the same, then the controller may be configured to set the designated ink stick identifier to the received identifier. If the first and second received identifiers are not the same, the controller may be configured to allow use of only ink with some default stick identifier or operation may be affected, such as by disabling printing operations until the ink stick is removed from the ink loader and/or to generate a user alert indicating that the inserted ink stick is not compatible with the printer. In this context, the “first” and “second” sticks are those subsequent to any quantity of allowable generic or alternatively acceptable, previously programmed ink stick identifiers. This provision allows the use of a common manufacturing, generic and/or start-up stick configuration that could be used for multiple product series or marketing plans. Such sticks may always be acceptable to the product or may be limited to some number of consecutive uses. The count for consecutive uses may be reset at various points based on time, product use, number of designated ink sticks used or be tied to maintenance or service.

As an alternative to establishing designated ink stick identifiers in the setup mode based on first or initial ink stick use, designated ink stick identifiers may be conveyed to the controller in one or more additional ways as depicted in FIG. 6. For example, in one embodiment, designated ink stick identifiers may be conveyed to the controller 20 in the setup mode based on the installation of an identifier conveyance component 300, such as single in-line memory module (SIMM), chip, electronic circuit board, universal serial bus (USB) module, or similar device. Accordingly, the imaging device may include a suitable interface point 304 that enables the installation of the identifier conveyance component to be installed in the imaging device. The interface 304 is in communication with the imaging device controller 20 so that upon installation of the identifier conveyance component the controller receives the one or more ink stick identifiers stored on the identifier conveyance component. The identifier conveyance component 300 may be configured to remain installed in the imaging device or may be configured for removal after the ink stick identifiers have been conveyed to the controller.

In another embodiment, ink stick identifiers may be conveyed to the controller as an input via a user interface 308 of the imaging device. In this embodiment, ink stick identifiers may be entered such as by typing or selection of the identifier(s) by a user or service technician. In this case, as the ink stick identifiers are input by the user or service technician, the input data is transmitted from the user interface 308 the controller 20. The user interface may correspond to the user interface on the imaging device. Alternatively, the user interface may be implemented remotely from, for example, a remote computer over the link 312. In any implementation, a special password or code may be required to successfully set one or more designated ink identifiers.

In yet another embodiment, designated ink stick identifiers may be conveyed to the controller by downloading the identifiers from a remote site such as a computer 310 connected to the imaging device controller over a link 314. The link can be implemented as a dedicated cable, a local area network (LAN), a wide area network, an intranet, the Internet, or any other distributed processing network, or any other known or later developed connection system. To download the designated ink identifiers, the computer can receive data via an Internet website or by telephone connection to a service center. Other equivalent methods for downloading the designated ink stick identifiers would be known to practitioners of ordinary skill in the art.

As an alternative to supplying ink stick identifiers to the controller during the setup mode to establish the designated ink stick identifier(s) for use with an imaging device, acceptable ink stick identifier(s) may be established in the setup mode by prompting the customer or printer operator for other information such as geographic location, promotional codes, etc. For example, a printer operator may be prompted via the user interface of the printer to input or select a geographic area designator. The controller may be programmed with or have access to a list of geographic designators and ink stick identifiers that are to be associated with the geographic designators. When a printer operator selects a particular geographic designator, the controller can access the list of geographic designators to determine the ink stick identifier(s) that are associated with that geographic designator and may set the acceptable ink stick identifier(s) to the identifier(s) associated with the selected geographic designator. A similar method may be used to set acceptable ink stick identifiers based on promotional codes or substantially any other information that may be input by a printer operator and associated with ink stick identifiers by the controller.

Once the designated ink stick identifiers have been set using one or more of the methods described above, the controller may be configured to exit the setup mode and enable printing operations utilizing the designated ink stick identifiers established during the setup mode. For example, as ink sticks are inserted during operations of the imaging device, the controller is configured to read the ink stick identifiers indicated by the sensor features of the inserted ink sticks and to compare the read identifiers to the established designated ink stick identifiers to determine whether the inserted ink sticks are the correct ink sticks for use with the imaging device.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of using a phase change ink imaging device comprising:

detecting an $n^{th}$ ink stick in an ink loader of a phase change ink imaging device where n is a predetermined number of ink sticks that have been received in the ink loader since installation of the phase change ink imaging device, the $n^{th}$ ink stick including at least one sensor contour associated with an ink stick identifier;

generating with a sensor system at least one signal with reference to the at least one sensor contour, the at least one signal being indicative of the ink stick identifier associated with the at least one sensor contour as the $n^{th}$ ink stick; and storing in a memory within the phase change ink imaging device the ink stick identifier indicated by the at least one signal as a designated ink stick identifier for use with the phase change ink imaging device.

2. The method of claim 1 further comprising:

enabling print operations of the phase change ink imaging device in response to the ink stick identifier indicated by the at least one signal being stored as the designated ink stick identifier.

3. The method of claim 2 further comprising:

detecting an ink stick in the ink loader immediately subsequent to the $n^{th}$ ink stick, the detected ink stick immediately subsequent to the nth ink stick including at least one sensor contour;

generating with the sensor system at least one signal with reference to the at least one sensor contour of the detected ink stick immediately subsequent to the nth ink stick, the at least one signal being indicative of an ink stick identifier associated with the at least one sensor contour of the detected ink stick immediately subsequent to the nth ink stick;

comparing the ink stick identifier associated with the at least one sensor contour of the $n^{th}$ ink stick to the ink stick identifier associated with the at least one sensor contour of the detected ink stick immediately subsequent to the $n^{th}$ ink stick; and storing in the memory of the phase change ink imaging device the ink stick identifier associated with the at least one sensor contour of the $n^{th}$ ink stick as a designated ink stick identifier for use with the phase change ink imaging device in response to the ink stick identifier associated with the at least one sensor contour of the $n^{th}$ ink stick corresponding to the ink stick identifier associated with the at least one sensor contour of the ink stick immediately subsequent to the $n^{th}$ ink stick.

4. The method of claim 1, the generation of the at least one signal further comprising:

actuating the sensor system in the ink loader to sense the at least one sensor contour of the $n^{th}$ ink stick to generate the at least one signal indicative of the ink stick identifier associated with the at least one sensor contour of the $n^{th}$ ink stick.

5. The method of claim 1 further comprising:

receiving at least one other ink stick in the ink loader subsequent to the storing of the ink stick identifier in the memory of the phase change ink imaging device as a designated ink stick identifier;

generating with the sensor system at least one signal with reference to at least one sensor contour on the at least one other ink stick, the at least one signal being indicative of an ink stick identifier associated with the at least one sensor contour on the at least one other ink stick;

comparing the ink stick identifier of the at least one other ink stick to the designated ink stick identifier; and generating a user alert in response to the ink stick identifier of the at least one other ink stick not corresponding to the designated ink stick identifier.

6. The method of claim 5 further comprising:

storing in the memory of the phase change ink imaging device as the designated ink stick identifier a default ink stick identifier prior to insertion of a first ink stick into the ink loader; and replacing the default ink stick identifier stored as the designated ink stick identifier in the memory of the phase change ink imaging device with the ink stick identifier associated with the at least one sensor contour of the $n^{th}$ ink stick by storing the ink stick identifier associated with the at least one sensor contour of the $n^{th}$ ink stick in the memory of the phase change ink imaging device as the designated ink stick identifier.

7. The method of claim 1 further comprising:

placing the phase change ink imaging device in a setup mode in which printing operations are disabled prior to a first ink stick being received in the ink loader; and exiting the setup mode in response to the designated ink stick identifier being stored in the memory of the designated ink stick identifier.

8. A method of operating a phase change ink imaging device comprising:

storing in a memory within the phase change ink imaging device an ink stick identifier as a designated ink stick identifier to enable a controller within the phase change ink imaging device to identify whether ink sticks inserted in an ink loader of the phase change ink imaging device are correct for use in the phase change ink imaging device;

placing the phase change ink imaging device in a setup mode that enables the designated ink stick identifier to be modified;

receiving at least one other ink stick identifier while the phase change ink imaging device is in the setup mode; and storing in the memory of the phase change ink imaging device the at least one other ink stick identifier as the designated ink stick identifiers.

9. The method of claim 8, the receiving of the at least one other ink stick identifier further comprising:

detecting an $n^{th}$ ink stick inserted into the ink loader of the phase change ink imaging device following entry of the phase change ink imaging device into the setup mode, the nth ink stick having a sensor contour associated with the at least one ink stick identifier; and generating with a sensor system at least one signal with reference to the at least one sensor contour of the detected $n^{th}$ ink stick, the at least one signal being indicative of the ink stick identifier associated with the at least one sensor contour.

10. The method of claim 8, the receiving of at least one other ink stick identifier further comprising:

receiving the at least one other ink stick identifier from an identifier conveyance component installed into the phase change ink imaging device.

11. The method of claim 10, the identifier conveyance component being one of a memory module, a universal serial bus (USB) module, and an electronic circuit board.

12. The method of claim 8, the receiving of at least one other ink stick identifier further comprising:

receiving the at least one other ink stick identifier as an input from a user interface of the phase change ink imaging device.

13. The method of claim 12, the user interface being incorporated into the phase change ink imaging device.

14. The method of claim 12, the user interface being a remote user interface in communication with the phase change ink imaging device over a network.

15. The method of claim 8, the receiving of at least one other ink stick identifier further comprising:

downloading the at least one other ink stick identifier from a remote location via a network.

16. The method of claim 8, further comprising:

placing the phase change ink imaging device in normal operating mode in response to the at least one other ink stick identifier being stored as a designated ink stick identifier.

17. The method of claim 16, further comprising:

detecting ink stick identifiers associated with coded sensor features on ink sticks received in the ink loader subsequent to the storing of the ink stick identifier as a designated ink stick identifier;

comparing the detected ink stick identifiers of the ink sticks to the designated ink stick identifier; and generating a user alert in response to a detected ink stick identifier not corresponding to the designated ink stick identifier.

18. An ink delivery system for use with a phase change ink imaging device, the system comprising:

an ink loader of a phase change ink imaging device, the ink loader being configured to receive ink sticks;

a sensor system in the ink loader configured to interact with sensor features of ink sticks inserted into the ink loader and to generate signals indicative of ink stick identifiers associated with the sensor features of the ink sticks;

a controller configured to detect entry into a setup mode and enable modification of one or more designated ink stick identifiers stored in a memory of the phase change ink imaging device by detecting one or more ink stick identifiers during the setup mode and storing the detected one or more ink stick identifiers in the memory as the designated ink stick identifiers.

19. The system of claim 18, the controller being configured to receive at least one of the one or more ink stick identifiers in the setup mode from an identifier conveyance component installed into the phase change ink imaging device.

20. The system of claim 18, the controller being configured to receive at least one of the one or more ink stick identifiers as an input via a user interface.

* * * * *